US005626650A

United States Patent [19]

Rodriguez et al.

[11] Patent Number: 5,626,650
[45] Date of Patent: May 6, 1997

[54] PROCESS FOR SEPARATING COMPONENTS FROM GASEOUS STREAMS

[75] Inventors: Nelly M. Rodriguez; R. Terry K. Baker, both of State College, Pa.

[73] Assignee: Catalytic Materials Limited, Mansfield, Mass.

[21] Appl. No.: 435,337

[22] Filed: May 5, 1995

Related U.S. Application Data

[63] Continuation-in-part of Ser. No. 374,033, Jan. 17, 1995, Pat. No. 5,458,784, which is a continuation-in-part of Ser. No. 947,416, Sep. 18, 1992, Pat. No. 5,413,866, which is a continuation-in-part of Ser. No. 602,182, Oct. 23, 1990, Pat. No. 5,149,584.

[51] Int. Cl.[6] ................................................ B01D 53/04
[52] U.S. Cl. .......................... 95/116; 95/128; 95/129; 95/138; 95/139; 95/900
[58] Field of Search ................................ 95/116, 127–129, 95/138, 139, 145, 900, 901, 903

[56] References Cited

U.S. PATENT DOCUMENTS

| | | | |
|---|---|---|---|
| 4,077,779 | 3/1978 | Sircar et al. | 95/26 |
| 4,229,188 | 10/1980 | Intille | 95/55 |
| 4,238,204 | 12/1980 | Perry | 95/55 |
| 4,398,926 | 8/1983 | Doshi | 95/104 |
| 4,663,230 | 5/1987 | Tennent | 428/367 |
| 4,734,394 | 3/1988 | Kosaka et al. | 95/138 X |
| 4,790,859 | 12/1988 | Marumo et al. | 95/138 |
| 4,810,266 | 3/1989 | Zinnen et al. | 95/139 |
| 4,963,339 | 10/1990 | Krishnamurthy et al. | 423/437 |
| 5,021,164 | 6/1991 | Gay | 210/694 |
| 5,118,329 | 6/1992 | Kosaka et al. | 95/901 X |
| 5,149,584 | 9/1992 | Baker et al. | 428/297 |
| 5,165,909 | 11/1992 | Tennent et al. | 423/447.3 |
| 5,389,350 | 2/1995 | Freeman et al. | 95/139 X |
| 5,413,866 | 5/1995 | Baker et al. | 423/447.2 |
| 5,458,784 | 10/1995 | Baker et al. | 210/674 |

FOREIGN PATENT DOCUMENTS

| | | | |
|---|---|---|---|
| 56-168824 | 12/1981 | Japan | 95/138 |
| 63-218230 | 9/1988 | Japan | 95/116 |
| 0833482 | 6/1981 | U.S.S.R. | 95/129 |

*Primary Examiner*—Robert Spitzer

[57] ABSTRACT

The present invention relates to the separation of one or more components from a multi-component gaseous stream. The component(s) being separated are relatively small molecular diameter gas components. They are separated by sorption techniques wherein the sorbent is a unique class of layered nanostructure materials, such as carbon nanofibers, characterized as having; (i) a surface area from about 0.2 to 3,000 $m^2/g$ as determined by $N_2$ adsorption at $-196°$ C., (ii) a crystallinity from about 5% to about 100%, and (iii) interstices from about 0.335 nm to about 0.67 nm.

19 Claims, 1 Drawing Sheet

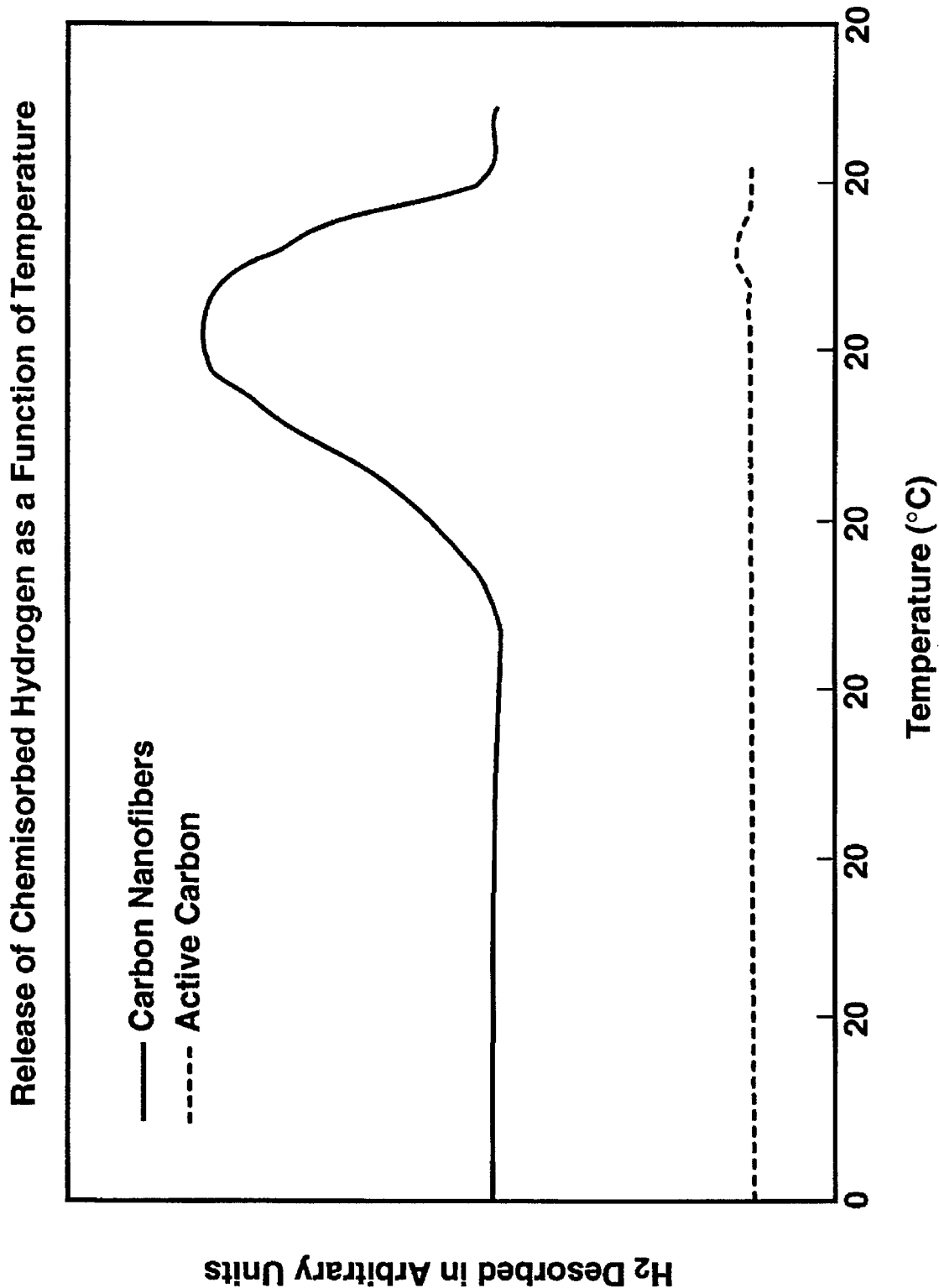

5,626,650

PROCESS FOR SEPARATING COMPONENTS FROM GASEOUS STREAMS

CROSS REFERENCE TO RELATED APPLICATIONS

This is a Continuation-In-Part of U.S. Ser. No. 08/374,033 filed Jan. 17, 1995, U.S. Pat. No. 5,458,784 which is a continuation-in-part of Ser. No. 07/947,416, Sep. 18, 1992, U.S. Pat. No. 5,413,866, which is a continuation-in-part of Ser. No. 07/602,182, Oct. 23, 1990, U.S. Pat. No. 5,149,584.

FIELD OF THE INVENTION

The present invention relates to the separation of one or more components from a multi-component gaseous stream. The component(s) being separated are relatively small molecular diameter gas components. They are separated by sorption techniques wherein the sorbent is a unique class of layered nanostructure materials characterized as having; (i) a surface area from about 0.2 to 3,000 $m^2/g$ as determined by $N_2$ adsorption at $-196°$ C., (ii) a crystallinity from about 5% to about 100%, and (iii) interstices from about 0.335 nm to about 0.67 nm.

BACKGROUND OF THE INVENTION

There are many processes using a wide variety of adsorbents and apparatus for separating various components from multi-component gaseous streams. Some processes are directed to purifying a gaseous stream by removing undesirable components while others are directed to removing and purifying a desirable component, such as hydrogen, that may be present in a stream in relatively small quantities. For example, fuel gas streams often contain substantial quantities of non-combustible components, such as nitrogen and carbon dioxide, along with the desired combustible component, methane. One conventional method for removing nitrogen and carbon dioxide from such streams is solvent extraction employing a solvent, such as monoethanolamine. Another conventional gas separation method is heat and mass exchange (HME) which is described in Chemical Engineering Science 40 (1985) No. 11, pp 2019–2025. Other methods include pressure swing adsorption (PSA) and thermal swing adsorption (TSA). Such processes are employed for a variety of applications where it is desired to separate a gaseous mixture into a first stream and a second stream. For example, the first stream can be one enriched relative to the feed mixture with respect to one or more component gases of the feed and the second stream can be enriched relative to the feed mixture with respect to one or more other component gases of the mixture.

Processes of the PSA and TSA type are normally operated on a cyclic basis using a plurality of beds of an adsorbent material. The cycle typically involves the basic steps of:

(a) passing a feed gas, at a first pressure, through an adsorbent bed wherein the more readily adsorbed component, or components, of the feed gas are adsorbed on the adsorbent while the less readily adsorbed component, or components, pass through the bed to give a first product stream at a pressure of the feed gas by the pressure drop provided by the resistance to flow of gas through the bed;

(b) desorbing the adsorbed gas from the adsorption bed by reducing the pressure and/or by increasing the temperature, e.g. by the passage of a heated regeneration gas therethrough; the desorbed gas thus gives a second product stream comprising the more readily adsorbed component, or components, of the feed gas; and (c) returning the adsorbent bed to the adsorption step (a).

Alternatively, a non-dynamic PSA cycle may be employed wherein, for example, a bed is pressurized with the feed gas, depressurized in two or more stages. In the initial depressurized stage or stages, the less readily adsorbed component, or components, are released and in a subsequent depressurization stage, or stages, the more readily adsorbed component, or components, are released.

As is well known in the art, various other steps can be included in the cycle, for example one or more pressure equalization steps, sweeping steps, rinsing steps, and/or purging steps can be used. The desorption can be effected in stages to give one or more streams at an intermediate pressure and/or temperature and containing components of intermediate adsorbability, as well as a stream containing the more readily adsorbed components. Examples of various PSA cycles are described in EP-A No. 183358.

The size of the adsorbent bed employed for any given separation depends on such things as the duration of the longest step in the cycle, e.g. the sorption or the desorption/regeneration step. The required volume of the sorbent bed in turn depends on the effectiveness of the sorbent which in turn depends, inter alia, on the ratio of the geometric surface area of the adsorbent to the volume of adsorbent present in the bed. Generally adsorbents have been employed in the form of pellets, e.g. small cylinders, or spheres. The geometric surface area of the sorbent can of course be increased by making the pellets smaller, but this has the disadvantage that, for a bed of given length to cross-sectional area ratio, the tendency of the bed to fluidization, and also the pressure drop across the bed, is increased. This is often undesirable from an economic point of view. The present invention employs a novel class of layered nanostructures having at least 5% crystallinity.

The separation of methane from gas mixtures, which also contains carbon dioxide, is disclosed in U.S. Pat. No. 4,077,779 which teaches a PSA system generally applicable to bulk separation of various gas mixtures, including the separation of carbon dioxide from its admixture with methane, in a six step cycle, wherein following selective adsorption of one of the components of the mixture, the adsorbent bed is rinsed with part of the adsorbed component at super atmospheric pressure. The pressure in the rinsed bed is lowered to an intermediate level to desorb the same, the withdrawn gas in this step being employed in the high pressure rinse step. The bed is next purged with an extraneous gas (air or inert), evacuated to remove the purge gas, followed by bringing the bed back to super atmospheric pressure for repetition of the cycle.

Also, U.S. Pat. No. 4,229,188 teaches a process for recovering hydrogen from a gas mixture containing hydrogen and normally liquid hydrocarbons. The feed stream is passed to a selective adsorption unit to initially separate the feed. The purge stream from the adsorption unit is substantially treated in a membrane separator to recover an additional amount of the desired component. Further, U.S. Pat. No. 4,238,204 discloses a process for recovering a light gas in both high purity and high yield from a gas mixture containing said light gas and other components. The gas mixture is initially directed to a selective adsorption unit which produces a high purity light gas and a purged gas containing at least a portion of the light gas. The purge gas from the adsorption unit is subsequently passed to a membrane permeator selectively permeable to the light gas in order to recover the permeated gas comprising light gas of improved purity.

U.S. Pat. No. 4,398,926 teaches a process for recovering hydrogen from a high pressure stream having a hydrogen content of up to about 90 mole %. The feed stream is passed to a separator containing a permeable membrane capable of selectively permeating hydrogen. The separator is used to achieve a bulk separation of the desired hydrogen component from impurities contained in the gas stream. The separated hydrogen is recovered at reduced pressure and passed to a pressure swing adsorption system adapted for operation at reduced pressure. Additionally, the off gas from the separator is recovered essentially at the higher pressure of the feed gas stream, and at least a portion of this stream is throttled to a lower pressure and passed to the pressure swing adsorption system as a co-feed gas in order to increase the recovery of the desired component.

Also, the production of hydrogen by the steam reforming of hydrocarbons is well known. The effluent from the reformer furnace is principally hydrogen, carbon monoxide, and carbon dioxide in proportions close to equilibrium amounts at the furnace temperature and pressure with a minor amount of methane. The effluent is conventionally introduced into a one- or two-stage shift reactor to form additional hydrogen and carbon dioxide. The shift reactor converts the carbon monoxide to carbon dioxide with the liberation of additional hydrogen by reaction at high temperature in the presence of steam. The combination of a hydrogen steam reformer and shift converter is well known to those of ordinary skill in the art. There have been proposed a number of schemes for treating the effluent from the shift converter to recover hydrogen and carbon dioxide therefrom, some of which include PSA techniques. For example, U.S. Pat. No. 4,963,339 teaches a process for producing highly purified gaseous hydrogen and carbon dioxide from a steam reformer/shift converter by passing the effluent from the latter through a multi-bed hydrogen PSA unit followed by an uncoupled carbon dioxide PSA unit. The carbon dioxide PSA unit produces a hydrogen-rich stream which is recycled to the feed to the steam reformer. A carbon dioxide-rich recycle stream is recycled to the carbon dioxide PSA unit feed and a carbon dioxide-rich product stream is introduced under pressure to a liquifier. A waste stream from the liquifier is recycled to the carbon dioxide PSA unit feed. A portion of the carbon dioxide rich product stream is withdrawn from the compressor at a stage such that its pressure is higher than that of the carbon dioxide PSA unit and returned thereto as a co-current purge preceding bed regeneration to obtain product.

While a number of the prior art processes for separating components from gaseous streams have been commercially practiced, there is still a need in the art for improved and alternative sorbents for such processes.

SUMMARY OF THE INVENTION

In accordance with the present invention, there is provided a process for selectively separating components from a gaseous stream, which components are those having a molecular diameter equal to or less than about 0.67 nm; which process comprises: (a) introducing a gaseous stream containing: (i) gaseous components having a molecular diameter equal to or less than about 0.67 nm, and (ii) gaseous components having a molecular diameter greater than about 0.67 nm into a bed of layered nanostructures characterized as having: (i) a surface area from about 0.2 to 3,000 $m^2/g$ by $N_2$ adsorption at $-196°$ C., (ii) a crystallinity from about 5% to about 100%, and (iii) interstices from about 0.335 nm to about 0.67 nm.

In a preferred embodiment of the present invention, the component to be separated from the gaseous stream is selected from the group consisting of hydrogen, oxygen, nitric oxide, nitrous oxide, carbon dioxide, ammonia, and acetylene.

In other preferred embodiments of the present invention, the component to be separated is hydrogen.

In still other preferred embodiments of the present invention, the separation process is conducted in a pressure swing adsorption unit.

In yet other preferred embodiments of the present invention, the carbon nanostructures are carbon nanofibers characterized as having: (i) a surface area from about 50 to 800 $m^2/g$; (ii) a crystallinity from about 50% to 100%; and (iii) a distance between graphite platelets of about 0.335 nm to about 0.40 nm.

BRIEF DESCRIPTION OF THE FIGURE

The sole FIGURE hereof is a temperature programmed desorption profile obtained in Example 7 hereof for active carbon and a carbon nanofiber sample of the present invention.

DETAILED DESCRIPTION OF THE INVENTION

The layered nanostructures, which are preferably inorganic, of the present invention which are used to separate gaseous components can be any suitable structure having: (i) a surface area from about 0.2 to 3,000 $m^2/g$, preferably from about 50 to 800 $m^2/g$, more preferably from about 100 to 700 $m^2/g$, and most preferably from about 250 to 350 $m^2/g$, which surface area is determined by $N_2$ adsorption at $-196°$ C.; (ii) a crystallinity from about 5% to about 100%, preferably from about 50% to 100%, more preferably from about 75% to 100%, most preferably from about 90% to 100%, and ideally substantially 100%; (iii) interstices of about 0.335 nm to about 0.67 nm, preferably from about 0.335 nm to about 0.40 nm, and most preferably about 0.335 nm. The size of the interstices can be chosen based on the molecular diameter of the gaseous molecule one wishes to separate from the gaseous stream. The gaseous molecular diameter of the gaseous component to be separated will be from about 0.335 nm to about 0.67 nm, preferably from about 0.335 nm to 0.40 nm. The nanostructures used in the present invention can also have a diameter from about 0.75 nm to about 1,000 nm, preferably from about 0.75 nm to about 500 nm, and more preferably from about 0.75 nm to 200 nm. It is to be understood that "nm" means nanometer.

Such structures will absorb the gaseous component into the interstices of the nanostructure. The most preferred layered nanostructures are carbon nanostructures. Although not wishing to be bound by theory, it is believed that the nanostructures of the present invention absorb the gaseous component by chemisorbing it into the interstices of the nanostructure. That is, by a non-dissociative mechanism, as opposed to a dissociative chemisorption method, like palladium hydrogen absorption wherein the hydrogen molecule is split and atomic hydrogen is held by palladium. It is most preferred that the nanostructures of the present invention be substantially ordered. That is, that they be substantially entirely graphitic having a crystallinity of at least 90%, particularly substantially about 100%, and a distance between graphite platelets of substantially 0.335 nm when the molecule to be separated is hydrogen. In the graphite structure the π-electrons are not associated with any individual carbon atom, but are equally shared by all of the carbon atoms in the graphite layer. As a result, each graphite platelet will possess a cloud of elections above and below the platelet. This feature confers a degree of metallic character on the material and enables it to undergo chemical interactions with selected gas and vapor molecules causing such entities to be strongly held onto the graphite plane surfaces (chemisorbed). In contrast, activated carbon is typically amorphous (none graphitic) and thus is composed of disordered material that has no available cloud of electrons for chemical interactions. In such a case, gas and vapor molecules are held onto the surface by relatively weak physical forces (physisorbed), and thus, selected gas molecules tend to reside within the micropores of the carbon solid. In order to enhance this physical absorption process, it is necessary to maintain the temperature of such materials at a very low temperature level, typically −196° C.

Non-limiting examples of preferred carbon nanostructures are those selected from carbon nanotubes, carbon fibrils, carbon nanoshells, and carbon nanofibers. Typically, the nanostructure will be substantially graphitic, and in the case of carbon nanofibers, the most preferred nanostructure for removing hydrogen from gaseous streams. The interstices will be the distance between graphitic platelets of about 0.335 nm. It is to be understood that the terms "carbon filaments", "carbon whiskers", "carbon nanofibers", and "carbon fibrils", are sometimes used interchangeably by those having ordinary skill in the art.

For purposes of the present invention, carbon fibrils, which themselves are sometimes referred to as carbon nanotubes, are of the type described in U.S. Pat. Nos. 4,663,230 and 5,165,909, both of which are incorporated herein by reference. Carbon fibrils are reported to be essentially cylindrical discrete structures characterized by a substantially constant diameter between about 3.5 nm and 70 nm, a length greater than about 5, preferably 100 times the diameter, an outer region of multiple essentially continuous layers of ordered carbon atoms having c-axis that are substantially perpendicular to the cylindrical axis of the fibril, and a distinct inner core region. Each of the layers and core are reported in the above patents to be disposed substantially concentrically about the cylindrical axis of the fibril. The carbon fibrils are catalytically grown by the thermal decomposition of a gaseous carbon-containing compound.

Carbon nanotubes, other than those which are sometimes also referred to as carbon fibrils, will typically be of the fullerene type. Such structures are described in an article by M. S. Dresselhaus et. al. entitled *Fullerenes*, on pages 2087–2092 in *Journal of Materials Research*, Vol 8, No. 8, August 1993, which article is incorporated herein by reference. Fullerenes are $C_n$ cage molecules built from a collection of hexagonal and pentagonal faces. The $C_{60}$ fullerenes are typically referred to as "buckminsterfullerenes" or simply "buckyballs". $C_{60}$-derived tubules can be defined, in simplest terms by bisecting a $C_{60}$ molecule at the equator and joining the two resulting hemispheres with a cylindrical tube one monolayer thick and with the same diameter as $C_{60}$. Carbon nanotubes can also be defined as substantially hollow structures comprised of substantially parallel graphite layers aligned at distances of about 0.33 5 nm to 0.67 nm from each other.

Carbon nanoshells, also sometimes referred to as carbon nanoparticles, are typically polyhedral layered structures comprised of multiple layers of carbon, forming substantially closed shells around voids of various shapes and sizes. Such materials are described in an article entitled "Encapsulation Of Lanthanum Carbide In Carbon Nanotubes And Carbon Nanoparticles", by Mingqui Liu and John M. Cowley; *Carbon*, Vol. 33, No. 2, pages 225–232; Elsevier Science Inc., 1995. For purposes of the present invention, a metal which is capable of dissociatively absorbing hydrogen, such as lanthanum and magnesium, is incorporated into the void, or hollow inner core of the carbon nanoshell.

The carbon nanofibers, which are the preferred carbon nanostructures of the present invention are produced by growing them with the use of a suitable catalyst in the presence of an effective carbon-containing compound. They are preferably grown from unsupported catalytic metal powders; although they can also be grown on a substrate onto which a catalytic metal particle precursor has been deposited. Non-limiting examples of suitable substrate materials from which the carbon nanofibers may be grown include: carbon materials, particularly carbon fibers; oxides such as alumina and silica; carbides, such as silicon carbide; nitrides, such as silicon nitride; and metallic substrates, such as a metallic wire, mesh, and screen; cellulosic material; and polymeric foam. It is preferred that the substrate be in a form selected from the group consisting of a sheet, a fiber, and a powder. If a metallic substrate is used from which the nanofibers of the present invention are grown, it is preferred that the metal not be one in which carbon can be readily dissolved. Preferred metallic substrates are those comprised of Ti, Ta, and Al. It is also within the scope of the present invention that a mixture of metal powders be used. That is, where all of the particles are catalyst particles wherein some portion of the particles are non-catalytic, such as ceramic particles. As previously mentioned, it is most preferred in the practice of the present invention that the nanofibers be grown without the use of a substrate.

Catalysts suitable for growing the carbon nanofibers of the present invention are Group VIII metals, preferably Fe and Ni-based catalysts. The catalysts are typically alloys or multi-metallics comprised of a first metal selected from the metals of Group IB of the Periodic Table of the Elements, and a second metal selected from the group consisting of Fe, Ni, Co, Zn, or mixtures thereof. Group IB metals are Cu, Ag, and Au. Preferred are Cu and Ag with Cu being the most preferred. The Group IB metals is present in an amount ranging from about 0.5 to 99 at. % (atomic %). A third metal may also be present. Although there is no limitation with respect to what the particular third metal can be, it is preferred that it be selected from the group consisting of Ti, W, Sn and Ta. When a third metal is present, it is substituted for up to about 20 at. %, preferably up to about 10 at. %, and more preferably up to about 5 at. %, of the second metal. It is preferred that the catalyst be comprised of copper in combination with Fe, Ni, or Co. More preferred is copper in combination with Fe and Ni from an economic point of view. That is, a catalyst of which Fe is used in place of some of the Ni would be less expensive than a catalyst comprised of Cu in combination with only Ni.

The shape of the nanofibers will be any suitable shape. Non-limiting examples of suitable shapes include straight, branched, twisted, spiral, helical, coiled, and ribbon-like. The most preferred shape for hydrogen storage are the branched and straight nanofibers. It is to be understood that the graphite platelets may have various orientations. For example, they can be aligned parallel, perpendicular, or at an angle with respect to the longitudinal axis of the nanofiber. Further, the surface area of the carbon nanofibers can be increased by careful activation with a suitable etching agent, such as carbon dioxide, steam, or the use of a selected catalyst, such as an alkali or alkaline-earth metal.

The structural forms of the nanofibers of the present invention can be controlled to a significant degree. For example, use of a catalyst which is comprised of only Fe will produce predominantly straight nanofibers having their graphite platelets substantially perpendicular to the longitudinal axis of the nanofibers. The distance between the platelets (the interstices) will be between about 0.335 nm and 0.67 nm, preferably from about 0.335 nm to 0.40 nm. It is most preferred that the distance be as close to 0.335 nm as possible, that is, that it be substantially 0.335 nm. The catalyst can also contain up to about 99 at. %, even up to about 70 at. %, or even up to about 50 at. %, preferably up to about 30 at. %, more preferably up to about 10 at. %, and most preferably up to about 5 wt. % copper, with the remainder being a Group VIII metal, preferably nickel or iron, more preferably iron. Catalysts having a high copper content (70 at. % to 99 at. %) will typically generate nanofibers which are predominantly helical or coiled, and which have a relatively low crystallinity (from about 5 to 25%). Lower concentrations of copper, e.g., 0.5 to 30 at. % have a tendency to produce spiral and branched nanofibers, whereas a catalyst with about 30 to 70 at. %, preferably 30 to 50 at. % copper will produce predominantly branched nanofibers.

The gaseous component to be separated can be sorbed by passing a multi-component gaseous stream containing said component through a bed of layered nanostructures of the present invention, in any suitable vessel. Typically, the gaseous stream will be introduced into a vessel containing a bed of the carbon nanostructures of the present invention at a pressure which will encourage the gaseous component to be sorbed into the interstices of the nanostructure. When the nanostructures are carbon nanofibers meeting the criteria of the present invention, a pressure is used from at least about 300 Torr to the pressure of nanostructure saturation, (possibly as high as several thousand Torr). It is preferred that at least about 350 Torr, more preferably at least about 400 Torr, and most preferably at least about 500 Torr, be used. A Torr is a unit of pressure that is equal to approximately $1.316 \times 10^{-3}$ atmosphere. The temperature at which the desired gaseous component is absorbed into the carbon nanostructures is at any suitable temperature. Preferred are temperatures from about room temperature (22° C.) to about 400° C., preferably from about 200° C. to 400° C., more preferably from about 300° C. to 400° C. It is within the scope of the present invention that the sorbed gaseous component be stored in the nanostructures for extended periods of time. For example, hydrogen can be stored in the nanofibers at substantially room temperatures and pressures for extended periods of time, although it may be desirable to use temperatures lower than room temperature and pressures higher than atmospheric pressure. Other carbon materials, such as activated carbon, require extremely low temperatures to hold the hydrogen in the structure. As previously stated, this is primarily due to the fact that materials, such as activated carbon, do not have chemisorption properties with respect to hydrogen. It is preferred that the nanostructures of the present invention have at least 4 liters, more preferably at least about 8 liters, most preferably at least about 16 liters, even up to about 24 liters of hydrogen stored therein per gram of nanostructure material.

If a substrate is used to grow the carbon nanofibers of the present invention, conventional techniques can be used to deposit a catalyst metal precursor on the surface of the substrate. Non-limiting examples of such techniques include incipient wetness, vaporization, and electrolytic deposition if the substrate is conducting. A typical incipient wetness technique includes dissolving a suitable salt of each metal of the catalyst in an appropriate solvent, then wetting the substrate, for example, carbon fibers, with the salt solution. The wetted substrate is then dried at a temperature greater than 100° C., preferably from about 105° C. to about 120° C., and more preferably at about 110° C. After drying, they are calcined at a temperature from about 200° to 300° C., thereby converting the individual metals to their respective oxide form. The so-treated substrate is then heated, in a hydrogen containing atmosphere, at a temperature from about 400° to about 600° C., preferably from about 450° to 550° C., for an effective amount of time, to produce the catalyst in an appropriate catalytic form. By effective amount of time, we mean that amount of time needed to reduce substantially all of the metal oxides to the respective multi-metallic state having a suitable particle size. Suitable particle sizes are from about 25 Å to about 1500 Å preferably from about 50 Å to about 1000 Å, and more preferably from about 50 Å to about 200 Å. The catalyst particle size determines the diameter of the nanofiber.

Metal salts suitable for use in the present invention are salts which are soluble in water, as well as in organic solvents. Non-limiting examples of water soluble salts suitable for use herein include nitrates, sulfates and chlorides. Non-limiting examples of salts soluble in organic solvents, which are suitable for use herein include formates, acetates, and oxalates. Preferred are the organic soluble salts because the substrate, if carbon fibers, will not have to be pretreated. However, if the substrate is a ceramic oxide, nitride, or boride, water soluble salts are preferred. Non-limiting examples of organic solvents suitable for use herein include: alcohols; such as methanol, ethanol, propanol, and butanol; ketones, such as acetone; acetates and esters; and aromatics, such as benzene and toluene.

When an aqueous solution of metal salt is used, it is preferred that the surface of the substrate, if carbon fibers, be pretreated to make the surface more acceptable to the catalyst. One preferred method of pretreating the carbon fibers is to oxygenate the fiber surface using atomic oxygen, or a compound that will produce atomic oxygen in a plasma. Although an oxidizing agent, such as nitric acid, can also be used, it is not preferred because it would have a tendency to oxygenate only the defect sites of the surface instead of oxygenating substantially the entire surface as would atomic oxygen. The surface of the substrate is preferably treated with atomic oxygen for an effective amount of time, at about room temperature. By effective amount of time, we mean for that amount of time, preferably for that minimum amount of time, needed to oxygenate substantially the entire surface of the carbon fibers.

If a vaporization technique is used to deposit the catalyst precursor, volatile metal salts, such as carbonyls, or the elemental metal, are used. Vaporization can be accomplished by any appropriate technique, such as vapor deposition.

The nanofibers of the present invention are produced by reacting the catalyst in a heating zone with the vapor of a suitable carbon-containing compound for an effective amount of time. By an effective amount of time, we mean, for that amount of time needed to produce the desired nanofiber structural arrangement. This amount of time will generally be from about 10 minutes to about 8 hours, preferably from about 10 minutes to about 6 hours, more preferably from about 15 minutes to 2 hours, and most preferably from about 15 minutes to about 1 hour. The heating zone is maintained at a temperature from the decomposition temperature of the carbon-containing compound to the deactivation temperature of the catalyst. Generally, this temperature will range from about 500° C. to about 700° C., and preferably from about 550° C. to about 650° C.

Carbon-containing compounds suitable for use in the practice of the present invention are compounds composed mainly of carbon atoms and hydrogen atoms, although carbon monoxide may also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include CO, methane, ethane, ethylene, acetylene, propane, propylene, butane, butene, butadiene, pentane, pentene, cyclopentadiene, hexane, cyclohexane, benzene, toluene. Combinations of gases are preferred, particularly carbon monoxide and ethylene.

It may be desirable to have an effective amount of hydrogen present in the heating zone. By an effective amount, we mean that minimum amount of hydrogen which will maintain a clean catalyst surface (free of carbon residue), but not so much that will cause excessive hydrogasification, or burn-off, of carbon from the nanofibers and/or fiber substrate structure, if present. Generally, the amount of hydrogen present will range from about 5 to 40 vol. %, preferably from about 10 to 30 vol. %, and more preferably from about 15 to 25 vol. %. Hydrogen serves two competing functions. For example, on the one hand it acts as a cleaning agent for the catalyst, and on the other hand it hydrogasifies, or causes carbon burn-off, of the carbon structure. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed in the heating zone. The Cu:Ni is so active that it utilizes essentially all of the carbon deposited thereon to grow nanofibers, and thus, there is generally no carbon residue to clean off.

After the nanofibers are grown, it may be desirable to treat the final structure with an aqueous solution of an inorganic acid, such as a mineral acid, to remove any excess catalyst particles. Non-limiting examples of mineral acids which can be used include sulfuric acid, nitric acid, and hydrochloric acid. Preferred is hydrochloric acid.

The edges of the graphite platelets may be etched with an appropriate etching agent, preferably carbon dioxide, steam, or a suitable catalyst such as an alkali or alkaline-earth metal. The nanofibers of the present invention are also suitable for the storage of other small gas molecules, such as He, $O_2$, NO, $N_2O$, $NH_3$, CO, $CO_2$, and $CH_4$, which can also be stored between the platelets.

It is also within the scope of the present invention that the nanostructures be treated so as to include minor amounts (about 1 wt. % to 5 wt. %, based on the total weight of the nanostructure) of a metal, preferably a transition metal capable of dissociatively absorbing hydrogen. Preferred transition metal dissociating agents include Pd, Pt, Ni, or alternatively a metal selected from the group consisting of Fe, Ru, Os, Co, Rh, Ir, La, and Mg—which can dissociatively absorb hydrogen.

The present invention will be illustrated in more detail with reference to the following examples, which should not be construed to be limiting in scope of the present invention.

EXAMPLE 1

A series of runs were conducted using 100 mg samples of a copper:nickel bimetallic powder (Cu:Ni ratio 3:7). Each sample was placed in a two inch diameter fused silica reactor tube at room temperature (about 22° C.) and then heated to a temperature of 350° C. in a 10% hydrogen/helium mixture at a flow rate of 100 standard cubic centimeters per minute (sccm) in a clam shell type electric furnace. These conditions were maintained for 30 minutes at which time the hydrogen flow was stopped and the sample brought to the desired reaction temperature in the presence of helium alone. Upon reaching the desired reaction temperature, the flow of helium was replaced by a flow of ethylene (100 sccm) and the reaction was allowed to proceed for 90 minutes. Following this procedure, the flow of ethylene was replaced with a flow of helium. The sample cooled to room temperature and reweighed to determine the amount of carbon produced. The weight changes of the samples are shown in Table I below.

TABLE I

Effect of Temperature on Carbon Filament Formation From Interaction of Cu:Ni (3:7) with Ethylene

| Sample | Temperature °C. | % Conv. of Ethylene to Carbon |
|---|---|---|
| a | 300 | 0 |
| b | 400 | 0 |
| c | 450 | 0 |
| d | 500 | 19 |
| e | 550 | 57 |
| f | 600 | 66 |
| g | 650 | 68 |
| h | 700 | 69 |
| i | 720 | 0 |
| j | 750 | 0 |

Subsequent examination of the carbon deposits in a scanning electron microscope showed that the carbon consisted entirely of filamentous, or nanofiber form.

EXAMPLE 2

The experimental procedure of Example 1 was followed except that the composition of the copper:nickel alloy powders was varied from 80:20 to 0:100 and the reaction temperature maintained at 650° C. The weight changes due to carbon formation on the alloy powders are shown in Table II below.

TABLE II

Effect of Catalyst Composition on the Production of Carbon Nanofibers

| Catalyst Composition Cu:Ni Ratio | % Conv. of Ethylene to Carbon |
|---|---|
| 80:20 | 9.8 |
| 70:30 | 59.6 |
| 50:50 | 71.0 |
| 30:70 | 69.2 |
| 20:80 | 63.7 |
| 10:90 | 54.3 |
| 0:100 | 31.1 |

EXAMPLE 3

The experimental procedure used in Example 1 was followed in all respects, except the reaction time was varied from 0.5 to 8 hours and the reaction temperature was maintained at 600° C. The weight changes due to carbon formation on the alloy powders are shown in Table III below.

TABLE III

Effect of Reaction Time on Carbon Nanofiber Yield

| Reaction Time (Hrs.) | % Conversion of Ethylene to Carbon |
| --- | --- |
| 0.5 | 59.5 |
| 1.0 | 67.3 |
| 1.5 | 66.0 |
| 2.0 | 62.4 |
| 3.0 | 58.7 |
| 4.0 | 56.9 |
| 5.0 | 57.8 |
| 6.0 | 56.1 |
| 8.0 | 50.2 |

EXAMPLE 4

In a series of comparison experiments, 100 mg of iron and nickel and various alloys of these metals were placed in the reactor system described in Example 1 and then initially heated in a 10% hydrogen/helium mixture (100 sccm) at 350° C. for 30 minutes. Following this treatment the samples were brought to a temperature of 600° C. in helium. The inert gas was removed from the system and the samples reacted in ethylene/hydrogen environment where the ratio of hydrocarbon/hydrogen was systematically varied from 100/0 to 10/90 for a constant reaction of 1.5 hours. The data obtained from these experiments is presented in Table IV.

TABLE IV

% Carbon Nanofiber Yield From Various Catalysts As a Function of Ethylene/Hydrogen Ratio

| Catalyst | % CARBON YIELD ETHYLENE/HYDROGEN RATIO | | | | | | |
| --- | --- | --- | --- | --- | --- | --- | --- |
|  | 100:0 | 4:1 | 2:1 | 1:1 | 1:2 | 1:4 | 1:9 |
| Nickel | 0 | 1.7 | 7.4 | 44.2 | 32.8 | 31.6 | — |
| Copper-Nickel (3:7) | 74.3 | 66.5 | 65.5 | 57.9 | 42.3 | 26.8 | 17.1 |
| Copper-Nickel (1:1) | 69.6 | — | — | 62.7 | 53.2 | 26.8 | — |
| Iron | 0 | 0.2 | 0.5 | 1.0 | 1.5 | 2.0 | — |
| Copper-Iron (3:7) | 0 | 3.3 | 6.4 | 60.7 | 52.8 | 27.1 | — |
| Silver-Iron (3:7) | 1.0 | 39.0 | — | 40.3 | — | 51.9 | — |
| Nickel-Iron (8:2) | 62.3 | 67.3 | — | 70.8 | — | 66.1 | — |
| Nickel-Iron (1:1) | 1.0 | 4.0 | — | 16.9 | — | 50.2 | 51.2 |
| Nickel-Iron-Copper (7:12:1) | 64.1 | 63.4 | 68.4 | 68.6 | 65.7 | 63.3 | 44.6 |

EXAMPLE 5

In another series of experiments 5 wt. % of catalyst, consisting of various ratios of copper and nickel were deposited onto carbon fibers (T-300). This carbon fiber supported catalyst system was initially calcined in air at 300° C. for 0.5 hours and then reduced in hydrogen at 300° C. for 1 hour. Following this treatment the supported catalyst was reacted in the apparatus described in Example 1 in an ethylene/hydrogen (1:1) mixture at 600° C. for 2.0 hours. After reaction the samples were cooled to room temperature in helium and the yield of carbon nanofibers formed on the parent fibers was determined by weight difference, and the values recorded in Table V below.

TABLE V

Effect of Catalyst Composition on the Production of Carbon Nanofibers on Carbon Fibers

| Catalyst Composition Cu:Ni Ratio | Grams of Carbon Deposited |
| --- | --- |
| 80:20 | 0.017 |
| 50:50 | 0.225 |
| 20:80 | 0.460 |
| 10:90 | 0.502 |
| 0:100 | 0.355 |

EXAMPLE 6

Straight nanofibers can be produced from the interaction of iron with a reactant comprising a mixture of carbon monoxide, ethylene, and hydrogen at a temperature between 500° and 1100° C. Optimum yields of nanofibers were found at 600° C. from a gas mixture of the composition ethylene, carbon monoxide, and hydrogen (3:1:1). It was found from high resolution transmission electron microscopy studies that when the catalyst was in the form of unsupported iron powder, the nanofiber structures produced had a stacking arrangement in which the graphite platelets were oriented substantially perpendicular to the axis of the nanofibers. The measured spacing between the graphite platelets was 0.335 nm. If the iron was dispersed on a suitable support medium, such as graphite, silica, or γ-alumina, the structure of the nanofibers was one in which the graphite platelets were aligned in a direction substantially parallel to the axis of the filament. Thus, unsupported nanofibers are preferred.

Table VI below shows the effect of gas composition on the yield of straight carbon nanofibers from the interaction of $C_2H_4$—CO—$H_2$ with unsupported iron powder at 600° C. and 60 minutes.

TABLE VI

| $C_2H_4$—CO—$H_2$ Molar Ratio | % Carbon Nanofiber Yield |
| --- | --- |
| 80:0:20 | 0.51 |
| 73:7:20 | 20.3 |
| 68:12:20 | 50.3 |
| 60:20:20 | 68.1 |
| 38:42:20 | 67.9 |
| 17:63:20 | 45.9 |
| 0:80:20 | 21.9 |

EXAMPLE 7

1.0 g. of highly graphitic carbon nanofiber produced from the Cu:Ni (3:7) catalyzed decomposition of ethylene at 600° C., were placed in a flow reactor tube, heated to 600° C. during exposure to a gas mixture comprising hydrogen, ethylene, and helium in a 1:4:5 ratio at 1 atmosphere for a period of one hour. Following this step, the nanofibers were removed from the reactor and placed in quartz U-tube and then heated in flowing $N_2$ under controlled conditions from room temperature up to 925° C. During this procedure, any sorbed gases were released from the nanofibers and their identity determined by a combination of gas chromatography and mass spectrometry. In the current experiment, the desorbed gas was found to be essentially pure hydrogen. This procedure was repeated for 1.0 g of active carbon and the data of both systems is displayed in the sole figure hereof. It can be seen that the carbon nanofibers of the present invention captured hydrogen during exposure to the gaseous mixture and started to release it when heated in nitrogen to about 500° C. and completed the operation at 900° C. In contrast, active carbon did not exhibit any tendency to sorb gas under these conditions, and as a consequence, did not show any desorption behavior.

What is claimed is:

1. A process for selectively separating components from a gaseous stream, which components are those having a molecular diameter equal to or less than about 0.67 nm; which process comprises: (a) introducing a gaseous stream containing: (i) gaseous components having a molecular diameter equal to or less than about 0.67 nm, and (ii) gaseous components having a molecular diameter greater than about 0.67 nm into a bed of layered nanostructures characterized as having: (i) a surface area from about 0.2 to 3,000 $m^2$/g by N2 adsorption at −196° C., (ii) a crystallinity from about 5% to about 100%, and (iii) interstices from about 0.335 nm to about 0.67 nm between graphite platelets.

2. The process of claim 1 wherein the nanostructure is a carbon nanostructure.

3. The process of claim 2 wherein the carbon nanostructure is selected from the group consisting of carbon nanotubes, carbon fibrils, carbon nanoshells, and carbon nanofibers.

4. The process of claim 3 wherein the carbon nanostructure is a carbon fibril characterized by a substantially constant diameter between about 3.5 nm and 70 nm, a length greater than about 5 times the diameter, an outer region of multiple essentially continuous layers of ordered carbon atoms having c-axis that are substantially perpendicular to the cylindrical axis of the fibril, and a distinct inner core region.

5. The process of claim 4 wherein the carbon fibrils are substantially cylindrical.

6. The process of claim 5 wherein the carbon fibrils are further characterized as having: a crystallinity from about 50% to 100%.

7. The process of claim 6 wherein the crystallinity is from about 90% to 100%.

8. The process of claim 7 wherein the surface area is from about 50 to 800 $m^2$/g and the interstices of about 0.335 nm to about 0.40 nm.

9. The process of claim 4 wherein the carbon nanostructure is a carbon nanotube characterized as having: a crystallinity from about 50% to 100%.

10. The process of claim 3 wherein the gaseous component to be separated is selected from hydrogen, oxygen, nitric oxide, nitrous oxide, carbon dioxide, ammonia, and acetylene.

11. The process of claim 10 wherein the gaseous component is hydrogen.

12. A process for selectively separating components from a gaseous stream, which components are those having a molecular diameter equal to or less than about 0.67 nm; which process comprises: (a) introducing a gaseous stream containing: (i) gaseous components having a molecular diameter equal to or less than about 0.67 nm, and (ii) gaseous components having a molecular diameter greater than about 0.67 nm into a bed of carbon nanofibers characterized as having: (i) a surface area from about 0.2 to 3,000 $m^2$/g by N2 adsorption at −196° C., (ii) a crystallinity from about 5% to about 100%, and (iii) interstices from about 0.335 nm to about 0.67 nm between graphite platelets.

13. The process of claim 12 wherein the carbon nanofibers are further characterized as having: a crystallinity from about 75% to 100%, and interstices of about 0.335 nm to 0.40 nm between graphite platelets.

14. The process of claim 13 wherein the crystallinity is from about 90% to 100%.

15. The process of claim 14 wherein the surface area is from about 50 to 800 $m^2$/g.

16. The process of claim 15 wherein the interstices are substantially 0.335 nm.

17. The process of claim 16 wherein the gaseous component is hydrogen.

18. The process of claim 15 wherein the gaseous component to be separated is selected from hydrogen, oxygen, nitric oxide, nitrous oxide, carbon dioxide, ammonia, and acetylene.

19. The process of claim 12 wherein the gaseous component to be separated is selected from hydrogen, oxygen, nitric oxide, nitrous oxide, carbon dioxide, ammonia, and acetylene.

* * * * *